United States Patent [19]

Hartheimer et al.

[11] Patent Number: 5,258,908
[45] Date of Patent: Nov. 2, 1993

[54] DETECTION AND PREVENTION OF DUPLICATE TRADING TRANSACTIONS OVER A COMMUNICATIONS NETWORK

[75] Inventors: Richard Hartheimer, Morris Plains, N.J.; Michael Coleman, Sydney, Australia; Chris Klepka, Parsippany, N.J.; Geoffrey Poole, Sydney, Australia

[73] Assignee: Foreign Exchange Transaction Services, Inc., Long Island City, N.Y.

[21] Appl. No.: 608,642

[22] Filed: Nov. 2, 1990

[51] Int. Cl.[5] .............................................. G06G 7/52
[52] U.S. Cl. ..................................... 364/408; 364/401; 364/800; 364/DIG. 1; 235/379; 235/380
[58] Field of Search ............... 364/408, 200, 800, 401; 235/379, 380

[56] References Cited

U.S. PATENT DOCUMENTS 5,077,665 12/1991 Silverman et al. .................. 364/408

OTHER PUBLICATIONS

"Quotron F/X Trader System Overview" 1990 Quotron Systems, Inc.
"Quotron F/X Trader User Manual" 1990 Quotron Systems, Inc.
Quotron Systems, Inc., "Interactive Demo Script", with copies of display screens as shown in Lisbon, Portugal, Spring/Summer 1989.

*Primary Examiner*—Donald E. McElheny, Jr.
*Assistant Examiner*—Gita D. Shingala
*Attorney, Agent, or Firm*—Robbins, Berliner & Carson

[57] ABSTRACT

A computer network system for simultaneously communicating between computer terminals at various bank locations for the purpose of entering a transaction for the exchange of currency of a selected currency pair provides a method for preventing a trading communication involving a selected currency pair between two banks wherein there is already a trading communication in progress between the two banks involving the same currency pair.

13 Claims, 4 Drawing Sheets

| USD/DEM | 1.6709-14 | CITQ | 10:48 | USD/JPY | 146.35-40 | DGBF | 10:49 |
| USD/DEM | 1.6711-16 | SBZZ | 10:49 | USD/JPY | 146.35-36 | CHKL | 10:49 |
| USD/DEM | 1.6710-16 | CHEN | 10:50 | GBP/USD | 1.7115-25 | NWBL | 10:51 |
| USD/CHF | 1.4730-40 | UBZA | 10:48 | GBP/USD | 1.7116-26 | BBIL | 10:50 |

SELECTED 4 ⇧
OTHER 12 ⇩

| 1 BOAL USD/DEM | 2 AMXL USD/DEM 10 | 3 CMBT USD/DEM 5+ | 4 CHMN USD/DEM | 5 | 6 |

BOAL USD/DEM IOUSD 23-MAY
CALL ALREADY IN PROGRESS

[CLEAR]

FIG. 2

DETECTION AND PREVENTION OF DUPLICATE TRADING TRANSACTIONS OVER A COMMUNICATIONS NETWORK

TECHNICAL FIELD

The present invention relates generally to a computer based trading system for trading transactions over a communications network, and more particularly to a method and apparatus for detecting and inhibiting any attempt to initiate a second trading communication which duplicates with an ongoing trading communication involving the same principals and the same subject matter.

CROSS-REFERENCE TO RELATED APPLICATIONS

For a more comprehensive view of what is presently regarded as the best mode of practicing the invention and its intended environment, reference should be made to the following commonly assigned to U.S. patent applications filed concurrently herewith:

"Financial Exchange System Having Automated Recovery/Rollback of Unacknowledged Orders, " U.S. Ser. No. 608,643.

"Activation of Dormant Bank Node Processor," U.S. Pat. Ser. No. 608,644.

"Terminal for Automated Trading System having Streamlined User Interface," U.S. Ser. No. 608,645.

The following documents published by Quotron Systems, Inc. describe various aspects of a trading system which embodies many aspects of the present invention and which is available for commercial use under the trademark "F/X Trader":

"Quotron F/X Trader System Overview," Winter 1989/90.

"Quotron F/X Trader Beta Version User Manual," Spring 1990.

"Quotron F/X Trader Beta Version System Administration Manual," Spring 1990.

Copies of the foregoing documents are included as part of this application and are hereby incorporated by reference.

BACKGROUND ART

A typical transaction in the foreign exchange trading industry involves two exchange traders (i.e., from different banks) who enter into a communication for the purpose of trading currency at an agreed upon exchange rate measured at an agreed upon time. Transactions such as these are initiated by a trader who, for example, sends a request for quote (RFQ) to a second trader (at another bank). The first and second traders can then negotiate the rate at which the currency pair which makes up the subject matter of the negotiations is to be exchanged. Presently, foreign trading transactions occur over relatively conventional means, such as the telephone, or relatively newer means, such as a computer-based communication network.

Although the relative merits of the prior art systems may be arguable as to their effectiveness for communication, each of the prior art systems allow an undesirable trading scenario to take place. Namely, the prior art systems allow for trading conversations to occur in "stereo". "Stereo" is a term of art describing the situation where two different trading conversations are taking place at the same time between a pair of banks, and where each trading conversation concerns the exact same currency pair. Generally, banks do not wish to be in a situation where traders in the same bank are bidding against each other. This situation can happen quite by accident, such as where two pairs of traders are unknowingly engaged in a trading conversation involving the same currency pair. Alternatively, "stereo" trading may occur when a single trader knowingly engages in a trading conversation with two different traders at the same bank at the same time and concerning the same currency pair.

SUMMARY OF THE INVENTION

In accordance with the method aspects of the present invention, duplicate trading conversations involving the same bank (or other identifiable principal) and the same currency pair (or other specific subject matter) are avoided by automatically controlling access to the terminals used to conduct such trading conversations. In the particular example of a foreign exchange trading transaction between banks, the trading system automatically determines whether a trading communication currently exists between the initiating and destination banks which involves the selected currency pair, and inhibits a second communication between the initiating and destination banks involving the selected currency pair.

To that end, the selected currency pair and destination bank is preferably registered in an associated look-up table maintained at the initiating bank before any transaction communication with a destination bank involving the selected currency pair is initiated, and is de-registered at the conclusion of the trading communication. In that case, the system is able to determine whether a duplicate conversation is already in progress merely by checking, in the relevant look-up table entries, to see whether the selected currency pair and counterparty is currently registered in an associated look-up table.

Preferably the selected currency pair and counterparty for each trading conversation currently in progress is registered not only at the initiating bank, but also at the destination bank. In any event, it is advantageous to check the look-up tables at both banks associated with a new trading conversation. To that end, before a request for quote is communicated to its designated recipient, the initiating bank checks its look-up table for any duplicate trading conversation which it might have previously initiated (and thus was registered in the initiating bank's look-up table) and which is still in progress (and thus is not de-registered in the initiating bank's look-up table); upon receipt of the request at the destination bank, the destination bank checks its own look-up table for any other trading conversation which the destination bank might have previously initiated with the initiating bank (and thus was registered in the destinations bank's look-up table) and which is still in progress (and thus is not de-registered in the destination bank's look-up table). By this means, even in the unlikely event that duplicate conversations were initiated simultaneously by traders at both banks (and thus there would not be any duplicate pending transactions registered when the conversations were initiated), both conversations would be automatically detected at their respective destination banks and thus could be inhibited before any potentially duplicate negotiations were permitted to take place.

In accordance with the apparatus aspects of the invention, each look-up table is preferably contained within a bank node processor connected to all terminals associated with a given bank, and each terminal is provided with means to read and update the look-up table at its associated bank node whenever a particular incoming or outgoing trading conversation is initiated or terminated, and to inhibit the initiation of any outgoing trading conversation which it determines is a duplicate of another conversation already in progress. In accordance with another apparatus aspect of the invention, the terminal includes both means to transmit a duplicate call message to a bank which initiates an incoming trading conversation which it determines is a duplicate call, and means to terminate an outgoing trading conversation upon receipt of a duplicate call message from the destination bank.

BRIEF DESCRIPTION OF THE DRAWINGS

Other objects and features of the present invention will be apparent from the following description of a presently preferred embodiment taken in connection with the accompanying drawings, in which:

FIG. 2 is a schematic diagram illustrating an exemplary display screen of the trading system having a plurality of windows disposed therein;

DETAILED DESCRIPTION OF THE PREFERRED EMBODIMENT

Figure 1:
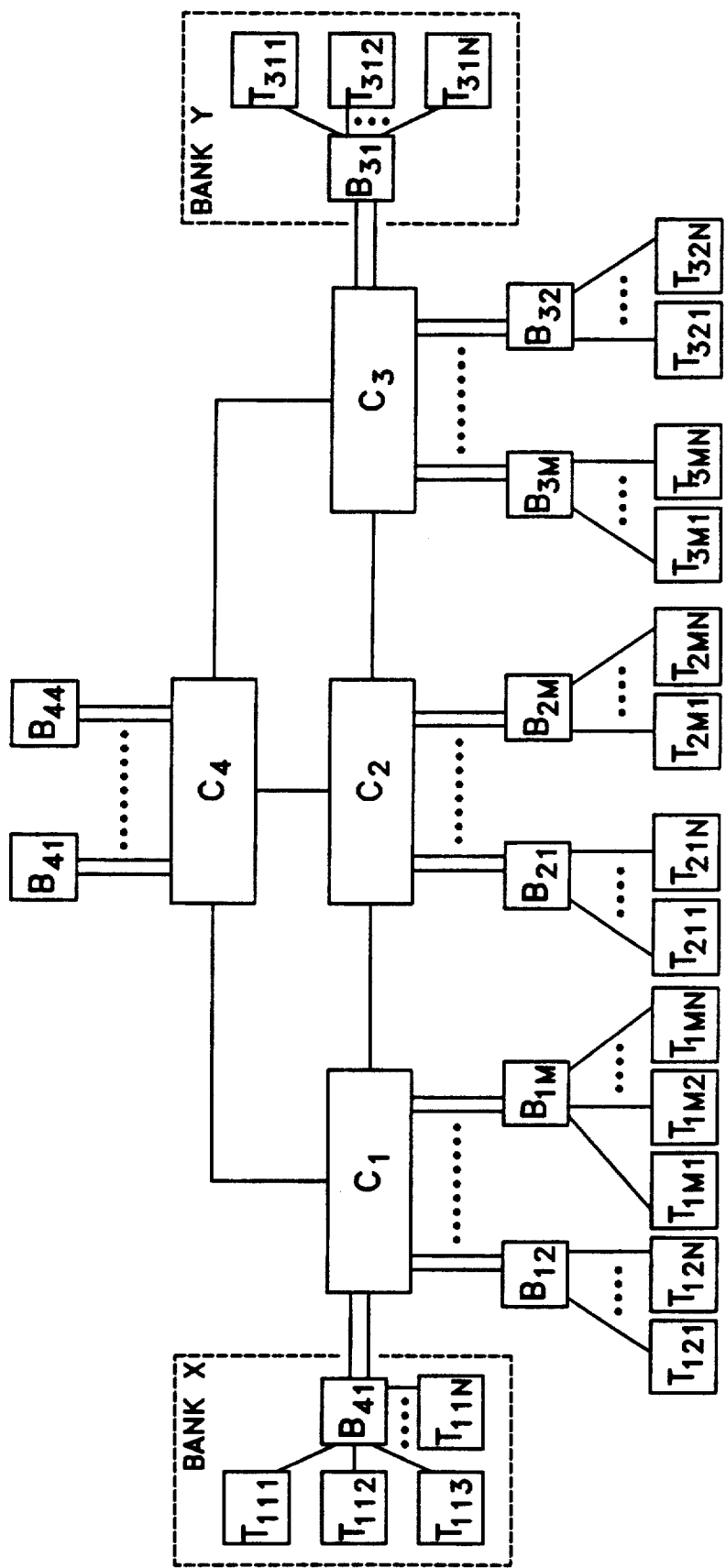
FIG. 1 is a system level schematic representation of a city network system having bank nodes connected thereto.

Referring initially to FIG. 1, an exemplary network of trading terminals is shown. The network comprises a plurality of city nodes C1 to C4, each connected to at least one bank node B11 to B4M. Each bank node is in turn connected to at least one trading terminal T111 to T3MN. The bank and city nodes generally provide a routing network and supervisory functions to allow a trading terminal connected to one bank node to communicate with a trading terminal (or trading terminals) connected to another bank node. The detail of the network structure is not important to an understanding of the present invention. Suffice it to say that the city nodes may be located in any city, and the city nodes may be connected in any combination necessary to facilitate the routing of calls from city to city and from bank node to bank node. For example, the city nodes may be located in the cities indicated in FIG. 1 wherein city node C1 is located in Tokyo, city node C2 in New York, city node C3 in Zurich and city node C4 in London.

The route over which messages are routed is invisible to the traders using the trading terminal. For example, a foreign exchange trader using the trading terminal T111 in Bank X in Tokyo can communicate with a foreign trader using the terminal T311 at Bank Y in Zurich. The message from Bank X to Bank Y initiates at terminal T111, is routed through the Bank X bank node B11 and then through the Tokyo city node C1. Upon receipt of the message at Bank Y, it gets routed to the Zurich city node, then to the Bank Y bank node B31 and finally to the trading terminal T311. The path that the message takes between the Tokyo C1 and Zurich C4 city nodes is entirely up to the decision making function of the network. For example, the message may go through New York C2 only, or London C3 only, or both New York and London before reaching Zurich.

There are a variety of messages and communications which can occur between traders, however, the most fundamental is a communication regarding the negotiation of the sale or purchase of currency. Briefly, in an exemplary system, the trading conversation is initiated by one trader requesting a quote (RFQ) from another trader. The other trader has a variety of options, the first of which includes whether he will even answer the RFQ. Other options include responding with a quote, or sending written messages back to the requesting party. The conversation is ended by either making a deal or refusing a deal, and hanging up.

Referring now to FIG. 2, an exemplary trading terminal screen is shown having a plurality of panels. An indicative rates panel 11 is provided and contains electronically updated indicative trading rates for selected currency pairs, wherein a currency pair is the two types of currency which are to be involved in the potential transaction. Example of currencies are the U.S. dollar (USD), the Great Britain pound (GBP), the Deutsch [German] mark (DEM), the Japanese yen (JPY) and the French franc (FRF).

An incoming call queue panel 12 is also provided. This panel prioritizes and displays the incoming calls arriving at the bank node to which the trading terminal is connected. Calls may also be sent to a particular trader, in which case this too is indicated in the incoming call queue panel. The remaining panels are conversation panels 13. It is in these panels that conversations between traders take place. The six conversation panels allow each trader to simultaneously conduct six trading transactions. The subject matter of the simultaneous transactions is unrestricted, except for the situation where traders at two banks are attempting to negotiate the same pair of currencies at the same time with each other.

For example, referring briefly to FIG. 1, assume a trader using terminal T111 at Bank X sends an RFQ involving the U.S. dollar and Japanese yen to Bank Y. As long as the request has been received by Bank Y and at least has been placed in the incoming calling queue in one or more trader terminals (more may have happened, such as the call may be answered), any future communication (other than the original one) between these two banks concerning the same two currencies will be inhibited. Thus, if terminal T111 is engaged in communication with terminal T311, no terminal at Bank X can be used to initiate conversation with any terminal at Bank Y which relates to the same currency pair. Similarly no terminal at Bank Y can be used to initiate conversation with any terminal at Bank X which relates to the currency pair. Thus, both outgoing RFQs from a party (the initiation of the request), and incoming RFQs from a counter-party (the reception of the request) are blocked. These features will be discussed at length below.

Figure 3:
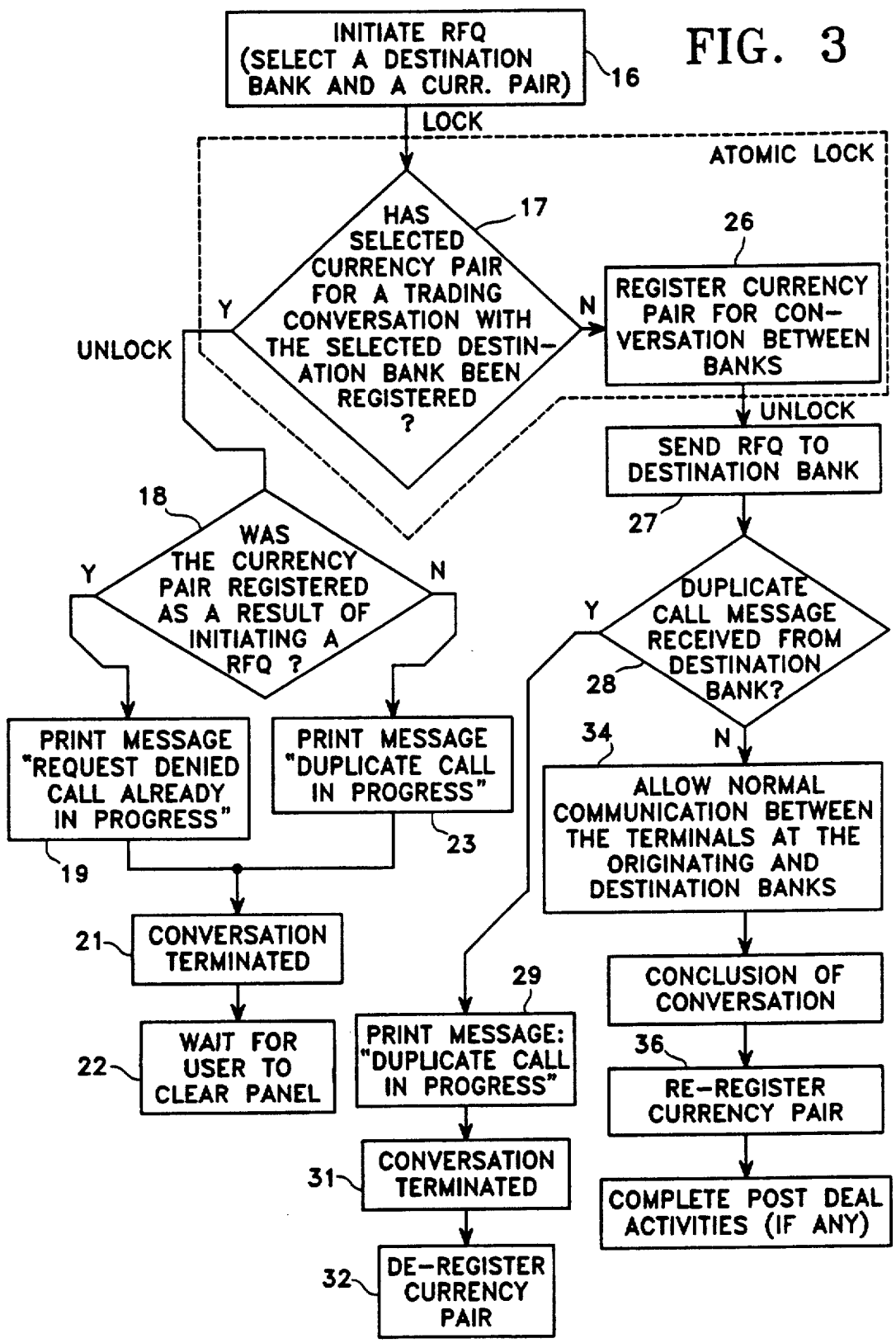
FIG. 3 is a flowchart illustrating the method of collision detection when processing an outgoing request for quote.

Referring now to FIG. 3, when a trader initiates an RFQ 16, the trader selects a destination bank (he may also select a specific trader terminal, but he must always identify the bank) and he identifies the currency pair for which he requests a quote. Once the RFQ is initiated, the system determines whether the identified currency pair is currently the subject of a transaction conversation between the originating bank and the destination bank 17. In an exemplary embodiment, the system accomplishes this by doing a table look-up and seeing whether the currency pair has been registered for the current pair of banks wishing to engage in communication.

For example, if a trader at Bank X wishes to engage in a trading conversation with a trader at Bank Y regarding the U.S. dollar and Japanese Yen, he initiates the process by inputting the destination bank and the selected currency pair at his terminal. The trader's terminal at Bank X will then initiate a table look-up at its associated bank node processor to determine whether the U.S. dollar and Japanese Yen currency pair has been registered for a trading conversation between Bank X and Bank Y.

If the currency pair has already been registered, this indicates that the currency pair is the subject matter of an outgoing request from the originating bank or an incoming request from the destination bank. The circumstances under which a currency pair can become registered will be apparent after reading the entire specification.

After determining that the currency pair has been registered, the next step 18 is to determine whether the registration was the result of a prior initiated RFQ or a prior received RFQ. If the registration was the result of a prior initiated RFQ, the next step 19 is to print a message on the originators terminal. In an exemplary embodiment, the message can read: "Request Denied. Call Already in Progress." The result of reaching this step is that the conversation or potential conversation between the two banks is terminated 21, and the conversation panel in which the conversation was to take place leaves the user only one option 22, that being to clear the panel.

If it is determined that the registration of the currency pair was the result of receiving a RFQ, the next step 23 is also to print a message on the originator's terminal. In an exemplary embodiment, the message can read: "Duplicate Call In Progress." Here also, the conversation is automatically terminated 21, and the conversation panel in which the conversation was to take place merely presents the duplicate call message and permits the user to clear the panel 22.

The key is that under both of the above conditions, the conversation is automatically terminated. It should be apparent to a person skilled in the art that any messages can be generated in response to the above conditions. The messages defined in the above described embodiment simply convey additional information to the trader as to why the conversation was terminated.

If, at the step of determining whether the currency pair has been registered 17, it is found that the currency pair has not been registered, then the system immediately registers the pair in the next step 26. In an exemplary system, this is accomplished by conventional means such as registering the currency pair in a table (or stack) corresponding to the particular pair of originating and destination banks.

In the following step 27, the RFQ is actually sent to the destination bank. The effect at the destination bank is that the RFQ request is placed in the incoming call queue panel of each terminal at the destination bank (or one terminal if a specific terminal is specified). The originating bank's system then determines whether the destination bank has sent the originating bank a duplicate call message 28. The conditions under which this message is sent from a destination bank will be considered below (in conjunction with FIG. 4).

If the duplicate call message has been received by the originating bank, then the process proceeds to display an appropriate message 29 on the terminal screen, the conversation is automatically terminated 31, and the conversation panel merely permits the user to clear the panel for use by another conversation. Further, the currency pair is de-registered 32. Note that the currency pair is only de-registered at the bank which initiated the RFQ. Thus, if this bank were to once again initiate an RFQ to the same bank, it would not be able to open a conversation with the other bank. Although the bank node processor does not list the currency pair as registered when it tries to send the RFQ, the processor would subsequently receive a duplicate call message since the destination bank has registered the pair.

If, however, the duplicate call message is not received from the destination bank (in step 28), the initiated RFQ reaches its destination and is placed in the incoming call queue panel on the terminals of the destination bank. Normal communications are then allowed to occur between the party and counter-party. "Normal communications" include a variety of options which are not relevant to the understanding of the present invention. Briefly, they can include answering the call, making offers, making counter offers and sending messages.

Normal communication continues until the trading conversation is concluded 34. This too may occur in several ways. First a deal may be reached, but also one of the parties may terminate the conversation by hanging up or the time may expire in which one of the parties was supposed to engage in an action. If the conversation concludes in the making of a deal (the parties reaching an agreement and binding themselves to it), there are typically some post deal activities, such as recording the deal, that must be completed. However, in the trading system, the parties are obligated once the deal is made. Therefore, immediately after this point, and prior to beginning the post-deal activities, the system de-registers the currency pair 36. Although FIG. 3 concerns only the flow of an initiated RFQ, it will be seen below that the system de-registers the currency pair following the conclusion of a conversation where the currency pair was registered as a result of an incoming, or received, request for quote.

It should also be understood, as shown in FIG. 3, that the currency pair will be de-registered after any type of conclusion of conversation, including those not involving the making of a deal.

Figure 4:
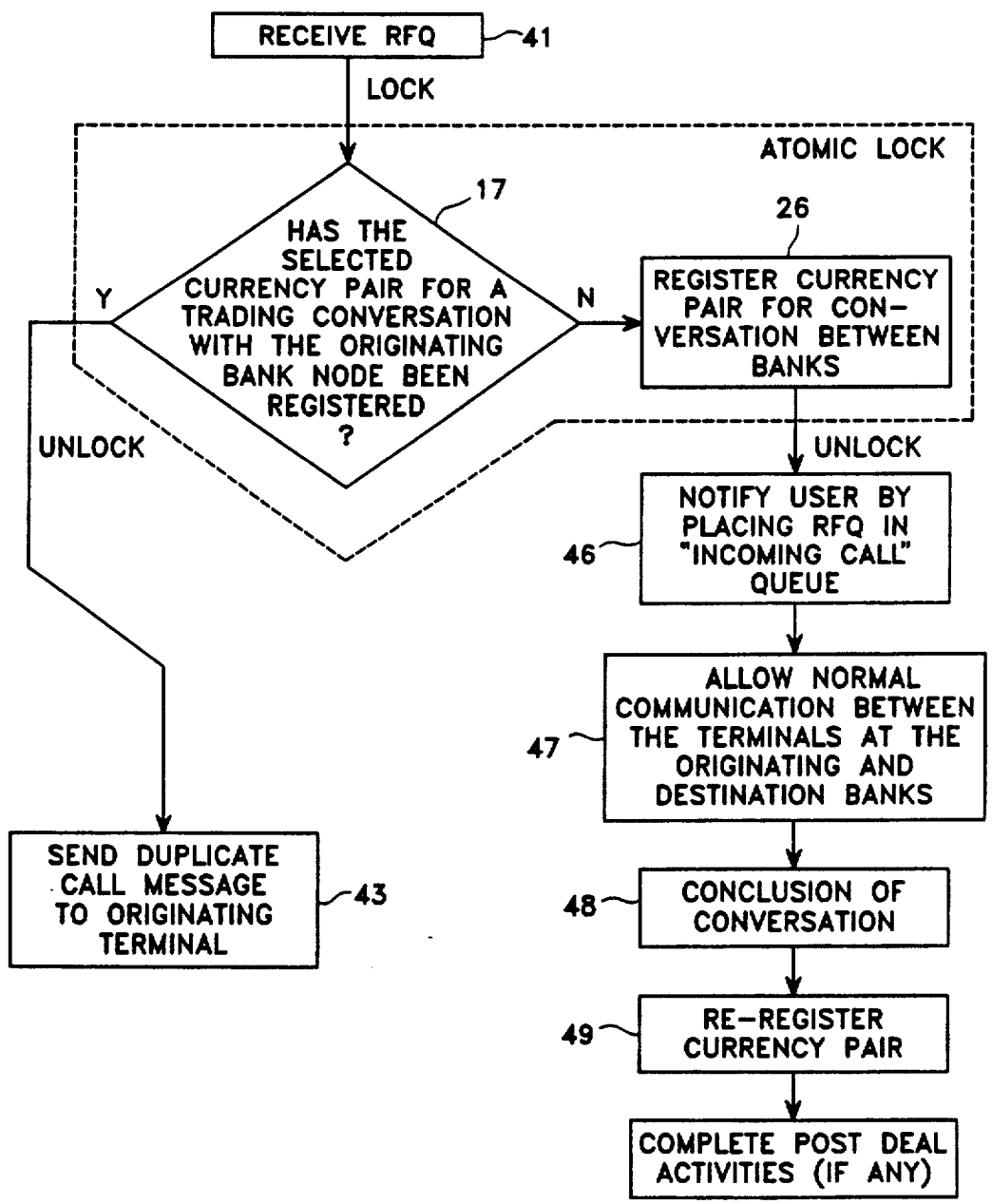
FIG. 4 is a flowchart illustrating the method of collision detection when processing an incoming request for quote.

Referring now to FIG. 4, when a request for an RFQ is received by a terminal at a particular bank node 41, the bank node processor's look-up table is immediately checked to see if the currency pair involved in the request has been registered for the banks involved in the potential trading communication 17. If the currency pair has been registered, then a duplicate call message is sent to the originating bank 43. (This duplicate call message will be received by the originating bank and will result in a message being displayed at the originating terminal along with the freezing of the conversation panel). In the exemplary embodiment, no message is displayed at the receiving bank's terminals. Note that the received RFQ is not even displayed in the incoming call queue panel.

If, however, the currency pair in the RFQ has not been registered, the system immediately registers it 26.

In the following step, the traders at the receiving bank are notified by placing the received RFQ in the incoming call queue panel of the bank's terminals 46. As in the case where the RFQ is initiated rather than received, normal communication between the banks is allowed 47 for the present RFQ. At the conclusion of the conversation 48, the currency pair is de-registered 49.

It is important to note that the registration of currency pairs occurs at the bank node, and thus the registration of a currency pair affects all of the trading terminals connected to the bank node. Thus, as briefly described above, when a first trader at Bank X, for example trader using terminal T111, initiates an RFQ directed at Bank Y for a specified currency pair, a second trader at Bank X will be prevented from using the other terminals at Bank X to send an RFQ to Bank Y concerning the same currency pair. Specifically, following FIG. 3, when the second trader at Bank X attempts to initiate the RFQ, a common look-up table maintained at the bank node processor and accessible to all the bank's trader terminals is checked for the prior registration of the currency pair. As long as the initial request to Bank Y has not been concluded, the currency pair will be registered, the second conversation will automatically be terminated, and a message indicating this will be displayed on the second traders terminal.

Similarly, any trader at Bank Y will be prevented from sending an RFQ to Bank X concerning the same currency pair. Thus, referring to FIG. 3 once again, when the second trader at Bank Y attempts to initiate the RFQ, Bank Y's bank node processor will find that the currency pair has already been registered. In this case, the registration will have taken place as a result of the reception of the initial RFQ from Bank X. The second trader at Bank Y will thus be unable to send the RFQ.

Of course, the same principles apply where one of the traders who is a party to the original transaction attempts to initiate a second conversation with a different trader at the counter-party's bank. For example, if the original RFQ originator at Bank X attempts to gain access to a second trader at Bank Y (for example, to try to receive more than one bid from the same source), he will be refused access since, when he tries to initiate the second call, the bank node processor will indicate to his terminal that the currency pair has been previously registered as a result of his initial call between Bank X and Bank Y.

Race conditions, for example, where two traders at Bank X attempt to reach a trader at Bank Y at substantially the same moment, are taken into account in the present system to insure that two trading conversations concerning the same currency pair do not occur. Specifically, the steps (17 and 26) shown in FIG. 3, wherein the bank node processor checks for a prior registration and then registers the currency pair if no registration is found, are an atomic (i.e., uninterruptable) operation. Thus, both of these operations must be completed with regard to one RFQ before the following RFQ is operated on.

One way to visualize this is to imagine a box surrounding the steps (the dotted line shown in FIG. 3). The box has one entry, namely, the path between the initiation of the RFQ and the step determining whether the currency pair is registered, and two exits, one following the determination that the currency pair has been registered and the other being after a previously unregistered pair has been registered. Once an initial RFQ is being processed by the checker function, the box is locked and the bank node processor cannot begin to process any other RFQ until the box in unlocked. The only way to unlock the box is for the original RFQ to be disposed of in some way, either by determining that the currency pair has been registered, or by registering it if it has not been registered.

If these functions were not atomic, then potentially a second RFQ could pass through the checking step prior to the bank node performing the registering step 26 in response to a first RFQ.

It should be understood that there is only one check and register function in each bank node processor, and that all RFQs initiated and received by that bank node must be processed by the single check and register function. Obviously, this prevents the check and register function from being done in parallel. In the race condition previously described, one of the RFQs must be processed before the other. The first one processed will be sent to the destination bank, but the second one will be stopped. This is true even where the requests are initiated at exactly the same moment in time. Since the check and register is a serial atomic operation, one of the RFQs must be processed first.

Another race condition is considered by the system to avoid duplicate trading conversations. Namely, where two banks, Bank X and Bank Y for example, simultaneously, or nearly simultaneously, initiate RFQs to each other for the same currency pair. In this case, when each bank node checked its table to see if the currency pair had been registered, it would not find the currency pair to be registered (since neither bank node has received the RFQ from the other bank). Thus, each bank node would be able to send out the RFQ. However, as the RFQ is received by each bank, the check function of each bank's bank node processor will find that the currency pair has already been registered, and thus will send a duplicate call message back to the originating bank. Therefore, neither of the RFQs will result in a trading conversation.

The same result may occur whenever two banks are trying to request a quote from each other regarding the same currency pair, and the RFQ from a first bank is initiated prior to its receiving the RFQ from the second bank. Note that, if the RFQ is received before an RFQ is initiated, the received RFQ has priority in the atomic check and register function, and will block out the initiated RFQ. When the RFQ is initiated before the RFQ from the second bank is received (and the initiated RFQ has not yet been received by the second bank before it sends out its RFQ), there is an electronic race between the bank nodes and the transmission of the signals. Namely, the bank that sends its RFQ first will get back a message that a duplicate call is in progress since the currency pair is registered in the second bank. When it receives this message, the conversation is terminated, thus de-registering the currency pair for that bank node (of the first bank). Meanwhile, a terminal at the second bank node is trying to send an RFQ to the first bank. If the sent RFQ is checked by the first bank node processor before it can de-register the currency pair, then a message is sent back to the terminal at the second bank node and the conversation is terminated (thus neither of the bank nodes were successful in entering into a trading conversation with the second bank). However, if the first bank node processor can clear and de-register the currency pair before it checks the RFQ sent from the second bank node, the RFQ will be accepted into the incoming call queue maintained by the first bank node.

The time it takes for messages to be sent depends primarily on the route that the city network provides and the speed with which the messages travel through the city network. The messages between the two bank nodes do not necessarily have to travel the same route. It is important to note that in a race situation, the electronic race may result in one trading conversation between the two banks. However, the race will never result in two simultaneous trading conversations regarding the same currency pair between the same two banks.

While the invention has been shown and described with reference to a presently preferred embodiment, it is understood by those skilled in the art that numerous changes in form and detail may be made therein without departing from the scope of the invention.

For example, the invention is applicable to any communications network used to conduct trading transactions of any kind. Thus, the traders may not be banks, or the banks described above can deal through third parties, such as brokers. Here, the principals will use trading terminals at "broker nodes" rather than bank nodes. Also, the subject matter of the trading conversation can be practically anything that a trading market exists for, such as bonds or precious metals, for example.

We claim:

1. In a computer network system allowing a plurality of simultaneous trading communications between respective computer terminals at an initiating bank location and a destination bank location for the purpose of executing a respective plurality of transactions for the exchange of respective currency pairs, a method for automatically controlling the access of terminals comprising the steps of:
    selecting a currency pair;
    automatically ascertaining whether a trading communication currently exists between the initiating and destination bank locations which involves the selected currency pair;
    inhibiting a second trading communication between the initiating and destination bank locations involving the selected currency pair; and
    registering the selected currency pair in a look-up table at the initiating bank each time the initiating bank initiates a transaction communication with the destination bank involving the selected currency pair.

2. A method as recited in claim 1 wherein
    the ascertaining step comprises the step of checking the look-up table at the initiating bank to determine whether the selected currency pair has been registered.

3. A method as recited in claim 1 further comprising the step of
    de-registering the currency pair at the conclusion of the trading communication.

4. In a computer network system allowing a plurality of simultaneous trading communications between respective computer terminals at an initiating bank location and a destination bank location for the purpose of executing a respective plurality of transactions for the exchange of respective currency pairs, a method for automatically controlling the access of terminals comprising the steps of:
    selecting a currency pair;
    automatically ascertaining whether a trading communication currently exists between the initiating and destination bank locations which involves the selected currency pair;
    inhibiting a second trading communication between the initiating and destination bank locations involving the selected currency pair; and
    registering the selected currency pair in a look-up table at the destination bank each time the destination bank receives a request for a transaction communication from the initiating bank involving the selected currency pair.

5. A method as recited in claim 4 wherein
    the ascertaining step comprises the step of checking the look-up table at the destination bank to determine whether the selected currency pair has been registered.

6. A method as recited in claim 4 further comprising the step of
    de-registering the currency pair at the conclusion of the trading communication.

7. In a computer network system allowing a plurality of simultaneous trading communications between respective computer terminals at an initiating bank location and a destination bank location for the purpose of executing a respective plurality of transactions for the exchange of respective currency pairs, a method for automatically controlling the access of terminals comprising the steps of:
    selecting a currency pair;
    automatically ascertaining whether a trading communication currently exists between the initiating and destination bank locations which involves the selected currency pair;
    inhibiting a second trading communication between the initiating and destination bank locations involving the selected currency pair; and
    inhibiting the transaction communication at each of the initiating and destination banks wherein the initiating bank initiates a trading communication with the destination bank involving the selected currency pair at substantially the same time as the destination bank initiates a trading communication with the initiating bank involving the selected currency pair.

8. A method as recited in claim 7 wherein each bank performs
    an initiating registration of the trading communication, involving the selected currency pair between the initiating and destination banks, upon the initiation of a trading communication, and
    a receiving registration of the trading communication, involving the selected currency pair between the initiating and destination banks, upon the reception of a trading communication.

9. A method as recited in claim 8 wherein
    the inhibiting step only inhibits both trading communications where each bank receives a request for trading communication prior to registering its initiating trading communication.

10. In a computer network system allowing for the simultaneous communication between computer terminals at an initiating and destination bank location for the purpose of entering a transaction for the exchange of currency, a method for automatically controlling the access of terminals comprising the steps of:
    initiating a request for quote (RFQ) by selecting a destination bank and a currency pair;

ascertaining whether the selected currency pair has been registered for the a transaction communication with the selected destination bank;
if the selected currency pair has been registered then: automatically ending the transaction communication; and displaying a message on the terminal indicating that the RFQ cannot be sent;
if the selected currency pair has not been registered, then: registering the currency pair;
sending the RFQ to the destination bank;
ascertaining whether a duplicate call message has been received from the destination bank;
if the duplicate call message has been received, then automatically ending the transaction communication and displaying a message on the terminal indicating the same;
if the duplicate call message has not been received, then allowing the transaction communication between the originating bank and the destination bank to proceed; and
de-registering the currency pair at the conclusion of the transaction communication.

11. A method as recited in claim 10 wherein the ascertaining and registering steps form a single atomic operation.

12. In a computer network system allowing for the simultaneous communication between computer terminals at a requesting and destination bank location for the purpose of entering a transaction for the exchange of currency, a method for automatically controlling the access of terminals comprising the steps of:
receiving a request for quote (RFQ) from a requesting bank, the RFQ identifying a currency pair to be the subject of a transaction communication;
ascertaining whether the identified currency pair has been registered for a trading communication with the requesting bank;
if the currency pair has been registered, then sending a duplicate call message to the requesting bank; and
if the currency pair has not been registered, then:
registering the currency pair;
placing the request in the incoming call queue;
allowing for normal transaction communication between the banks; and
de-registering the currency pair at the conclusion of the transaction communication.

13. A method as recited in claim 12 wherein the ascertaining and registering steps form a single atomic operation.

* * * * *